United States Patent [19]
Johnson

[11] Patent Number: 6,154,144
[45] Date of Patent: Nov. 28, 2000

[54] AUTO SHUTOFF OVERFLOW CONTROLLER

[76] Inventor: Stephen Johnson, 3 Windsor Ct., Algonqiun, Ill. 60102

[21] Appl. No.: 09/129,349

[22] Filed: Aug. 5, 1998

[51] Int. Cl.⁷ .................................................. G08B 21/00
[52] U.S. Cl. .......................... 340/620; 340/621; 340/618; 340/616; 137/558; 137/55; 137/312
[58] Field of Search ....................................... 340/620, 618, 340/616, 605, 621; 73/304 R; 137/558, 551, 312

[56] References Cited

U.S. PATENT DOCUMENTS

| | | | |
|---|---|---|---|
| 4,569,312 | 2/1986 | Riddell et al. | 122/504.2 |
| 4,595,341 | 6/1986 | Castell-Evans | 417/1 |
| 4,600,844 | 7/1986 | Atkins | 307/118 |
| 4,742,244 | 5/1988 | Koerner | 307/118 |
| 4,814,752 | 3/1989 | Lehman | 340/616 |
| 4,845,472 | 7/1989 | Gardon et al. | 340/605 |
| 4,940,861 | 7/1990 | Rizzuto | 200/84 R |
| 4,952,914 | 8/1990 | Mueller | 340/620 |
| 4,987,408 | 1/1991 | Barron | 340/604 |
| 5,111,691 | 5/1992 | John et al. | 73/292 |
| 5,155,472 | 10/1992 | Dam | 340/621 |
| 5,216,288 | 6/1993 | Greene | 307/188 |
| 5,240,022 | 8/1993 | Franklin | 137/1 |
| 5,314,313 | 5/1994 | Janesky | 417/63 |
| 5,345,224 | 9/1994 | Brown | 340/605 |
| 5,365,220 | 11/1994 | Rasmason | 340/620 |
| 5,632,302 | 5/1997 | Lenoir, Jr. | 137/312 |
| 5,717,383 | 2/1998 | Dreyer et al. | 340/621 |
| 5,719,556 | 2/1998 | Albin et al. | 340/618 |

Primary Examiner—Jeffery A. Hofsass
Assistant Examiner—Tai T. Nguyen
Attorney, Agent, or Firm—Kajane McManus

[57] ABSTRACT

The Automatic Shutoff Overflow Controller comprises a circuit which engages between a source of power and a water processing device, the controller, sensing an undesirably high water level in the device, shutting off the device and producing an audible warning that such condition exists.

6 Claims, 1 Drawing Sheet

AUTO SHUTOFF OVERFLOW CONTROLLER

BACKGROUND OF THE INVENTION

1. Field of the Invention

The present invention relates to an overflow controller with automatic water shutoff capability. More particularly, the controller is proposed for use in disabling a water processing device temporarily when an excessive level of conductive fluid is detected in a container for same.

2. Prior Art

Heretofore numerous structures have been proposed for controlling fluid levels in a container and/or for shutting off a source of the fluid upon detection of an excessive level of the fluid.

As will be described in greater detail hereinafter, it is believed that the controller of the present invention offers a simpler yet more featureful controller than those previously disclosed.

SUMMARY OF THE INVENTION

According to the invention there is provided an automatic shutoff overflow controller for use in shutting off a powered liquid processing device when an undesirably high level of liquid is sensed in a liquid containment of the device, the controller comprising a circuit engaged between the device and a source of power therefor and including a conductive sensor probe placed at a desired level within the liquid containment and, when the probe becomes immersed in liquid, causing an audible warning to be produced and interrupting the flow of power from the source to the device.

DESCRIPTION OF THE PREFERRED EMBODIMENTS

Figure 1:
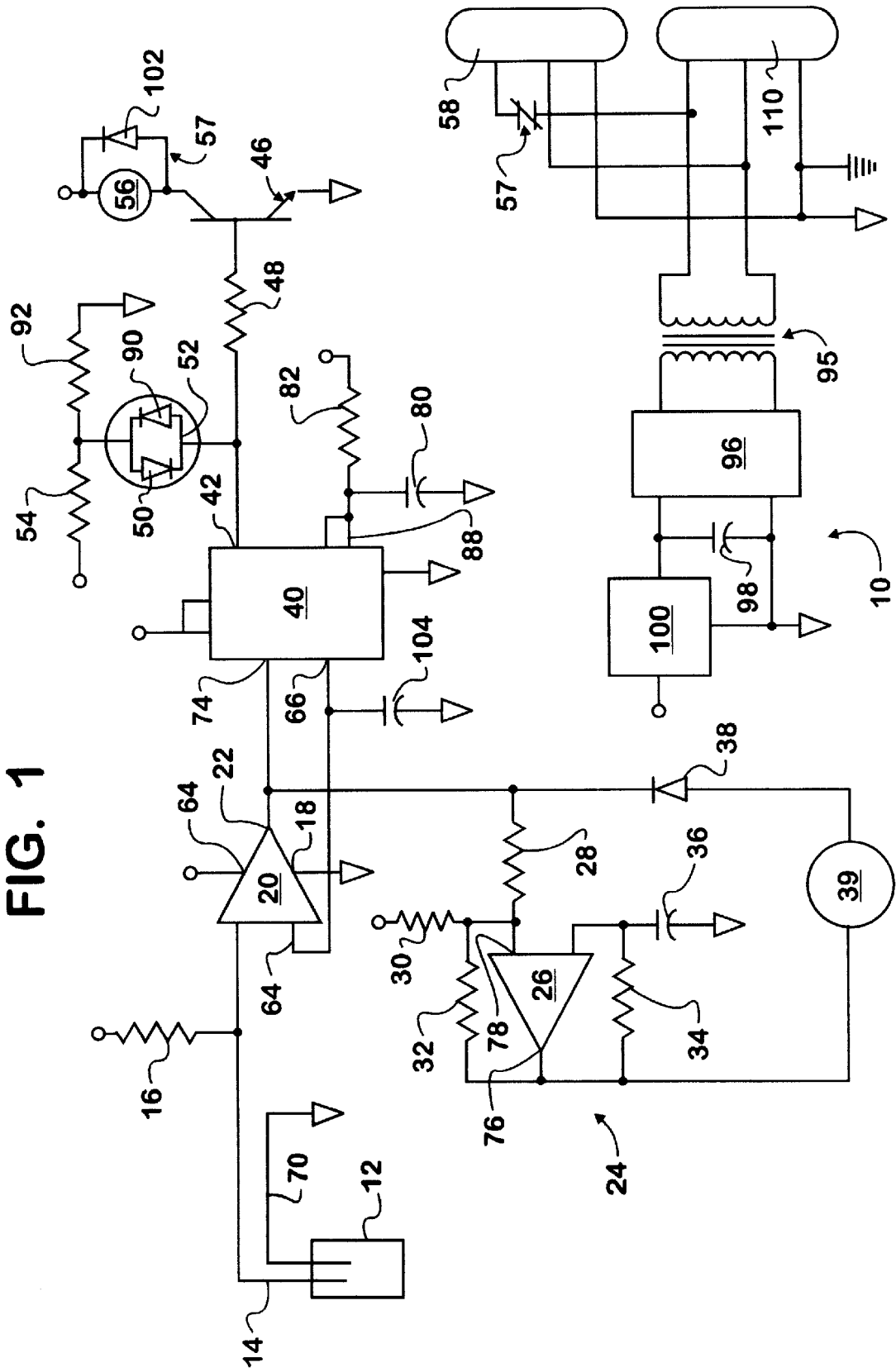
FIG. 1 is a detailed schematic diagram of the circuit defining the controller of the present invention.

Referring now to FIG. 1 in greater detail, there is illustrated therein a schematic circuit diagram of the auto shutoff overflow controller of the present invention generally identified by reference numeral 10.

It will be understood that this circuit 10 is intended for use in situations where a conductive liquid, such as water, can rise above a desired level to overflow a containment therefor. The circuit 10, when activated, acts to stop flow of water into the containment, such as to shut off a washing machine or similar appliance when the level of liquid therein has been determined to have risen above a desired level.

Beginning at the left of the Figure, a probe 12 is shown. In this circuit 10, one of the conductive electrode 14 of the probe 12 is held at +12V through a 1M resistor 16. The presence of this voltage at a positive input 18 of an operational amplifier 20, which operates in this case as a comparator 20, forces an output 22 of the operational amplifier 20 to be maintained at +12V. An oscillator section 24 is provided and is comprised of an operational amplifier 26, three 10K resistors 28, 30, and 32, 470K resistor 34, 22μ capacitor 36, diode 38, and an audio signal generator 39, with the oscillator section 24 being normally held in an inactive state.

A 555 timer 40 is also provided and is in a ready state, with an output 42 thereof held low. This condition produces a high level of current at output 42, turning off a transistor 46 through a 10K resistor 48, and causing a green section 50 of a light emitting diode (LED) 52 to illuminate through a 1K resistor 54. Turning off transistor 46 disables a relay 56 and the normally closed contacts 57 controlling an appliance or the like (not shown) being monitored are maintained closed, allowing AC power from source thereof (not shown) to flow in a control circuit atria connector 58.

At the same time, a negative input 64 of operational amplifier 20 is held at approximately +8 volts by connection to a control/reference output 66 of timer 40.

In an overflow condition, the presence of a conductive liquid between conductive electrodes 14 and 70, electrode 70 being tied to ground of probe 12 causes current to flow in 1M resistor 16. When current flow is sufficient to cause a voltage drop of greater than is approximately 8 volts across 1M resistor 16, the output 22 of operational amplifier 20 will also drop to a low voltage of approximately 0.3 volts.

When this low voltage appears at the connection of a 10K resistor 28, a diode 38, and a trigger input 74 of timer 40, the output 76 of operational amplifier section 26 rises to +12V. This voltage increase has two effects.

First, the audio signal generator 39 is powered up and begins to emit a warning tone. The return path for current driving audio signal generator 39 takes the current through diode 38, which ensures that an audible signal cannot be produced by stray current when the circuit 10 is inactive.

Secondly, the voltage increase charges 22μ capacitor 36 which is initially in a discharged state. When the voltage on 22μ capacitor 36 rises to a level of voltage present at input 78 of operational amplifier 26, the output 76 of the operational amplifier 26 switches to a low state, shutting off the audio signal generator 39 and causing 22μ capacitor 36 to discharge through 470K resistor 34. The time required for the charge/discharge cycle is approximately 10 seconds, obtaining by multiplying 470K ohms by 22 microfarads, (34×36) producing an intermittent signal by causing the audio signal generator 39 to operate for ten seconds, then become disabled for ten seconds, until conductive liquid in contact with the probe 12 is removed.

Resistors 32, 30 and 28 form a voltage divider applying approximately 4 volts at input 78 of operational amplifier 26 when the output 76 thereof is low, and about 8 volts at input 78 when the output 76 is high, causing an oscillation of capacitor 36 voltage between 4 and 8 volts while the circuit 10 is active.

A further effect of the low signal at operational amplifier 20 is to cause the timer 40 to begin a timing cycle. A 47μ capacitor 80 begins to charge through a 470K resistor 82. When the voltage on 47μ capacitor 80 reaches ⅔ of the power supply voltage (12V), the output of timer 40 will go high. This time is approximately 25 seconds (1.1×82×80). An output 88 of timer 40 then discharges 47μ capacitor 80 and the circuit is held in this state until the low voltage level at trigger pin 74 of timer 40 is raised by decreasing the level of conductive liquid present to a level below that of the probe 12.

When the output 42 of timer 40 goes high, the green light emitting diode 50 turns off and a red section 90 of LED 52 turns on, powered through 1K resistor 92, and transistor 46 also turns on through 10K resistor 48. The relay 56 is then energized, opening normally closed control circuit contact 57, engaged within the positive (hot) line of the connector 110, and disabling the appliance connected to atria 58.

Power for the circuit 10 is provided by step down transformer 95 which reduces the AC supply voltage to approximately 18 volts. This AC voltage is rectified to pulsating DC by rectifier bridge 96, and the pulsating DC is smoothed by a 1000μ capacitor 98. A regulator 100 takes the smoothed DC voltage and regulates it down to +12 V to operate the circuit 10.

A diode 102 is included to prevent the relay 56 coil from generating harmful transients when transistor 46 is turned off.

A 0.01μ capacitor 104 is included to filter the reference voltage at output 66 of timer 40 and to provide a low impedance path to ground for any electrical noise that may be picked up at this sensitive point of the circuit 10.

A connector 110 is connected to a source of AC power (not shown) to operate both the circuit 10 and the controlled appliance engaged to the atria 58 thereof.

As described above, the simple circuit 10 provides a number of advantages, some of which have been described above and other of which are inherent in the invention, Also, modifications may be proposed to the circuit 10 without departing from the teachings herein. Accordingly, the scope of the invention is only to be limited as necessitated by the accompanying claims.

I claim:

1. An electrically powered automatic shutoff overflow controller for use in shutting off an electrically powered liquid processing device when an undesirably high level of liquid is sensed in a liquid containment of the device, the controller comprising a circuit engaged between the device and a source of power therefor, the circuit including a connector engaged to the source of power for the device, an atria to which the device is electrically engaged, a normally closed relay incorporating a delay timer positioned between the connector and the atria, and a conductive sensor within a probe placed at a desired level within the liquid containment and, when the probe becomes immersed in liquid, causing an audible warning to be produced and interrupting the flow of power from the source to the device.

2. The controller of claim 1 wherein a comparator is functionally engaged to the relay in a manner to cause opening of contacts of the relay when voltage from the probe exceeds a reference voltage beyond a predefine delay period to effectively disconnect the device from the source of power.

3. The controller of claim 2 wherein the comparator also powers on an audio signal generator upon opening the relay contacts.

4. The controller of claim 3 wherein the circuit includes a timer for causing the audio signal generator to cycle on and off when the relay contacts are open.

5. The controller of claim 2 wherein the circuit includes a visual indicator of the status thereof which is normally green and changes to red when the relay contacts are opened.

6. The controller of claim 5 wherein the circuit is reset when sufficient liquid drains from the containment therefor to keep the liquid from contacting the probe.

* * * * *